United States Patent
Senda et al.

(10) Patent No.: US 7,329,204 B2
(45) Date of Patent: Feb. 12, 2008

(54) REGENERATIVE CONTROL APPARATUS FOR VEHICLES EQUIPPED WITH A LOCK-UP CLUTCH

(75) Inventors: Takashi Senda, Niwa-gun (JP); Daiji Isobe, Toyohashi (JP)

(73) Assignee: Denso Corporation, Kariya (JP)

( * ) Notice: Subject to any disclaimer, the term of this patent is extended or adjusted under 35 U.S.C. 154(b) by 217 days.

(21) Appl. No.: 11/316,911

(22) Filed: Dec. 27, 2005

(65) Prior Publication Data

US 2006/0142115 A1 Jun. 29, 2006

(30) Foreign Application Priority Data

Dec. 28, 2004 (JP) .............................. 2004-380046

(51) Int. Cl.
*B60W 10/02* (2006.01)
(52) U.S. Cl. .................. 477/5; 477/180; 180/65.3; 903/942
(58) Field of Classification Search .............. 477/5, 477/6, 53, 62, 174, 180, 3, 7; 180/65.2–65.4; 903/942, 943, 946, 947, 930
See application file for complete search history.

(56) References Cited

U.S. PATENT DOCUMENTS

| | | | | |
|---|---|---|---|---|
| 5,816,979 A | * | 10/1998 | Shiiba et al. ............... | 477/176 |
| 5,842,953 A | * | 12/1998 | Yasue et al. ................ | 477/174 |
| 6,597,979 B2 | * | 7/2003 | Hagiwara et al. ............ | 701/67 |
| 6,805,211 B2 | * | 10/2004 | Fujikawa .................... | 180/65.2 |

2004/0149502 A1 8/2004 Itoh et al.

FOREIGN PATENT DOCUMENTS

| | | |
|---|---|---|
| JP | A 07-310566 | 11/1995 |
| JP | A 2000-134713 | 5/2000 |
| JP | A 2004-224110 | 8/2004 |

OTHER PUBLICATIONS

Korean Intellectual Property Office, Notice of Preliminary Rejection, Oct. 31, 2006, Relating to Korean Application No. 10-2005-0130964, English Translation.*

* cited by examiner

Primary Examiner—Charles A. Marmor
Assistant Examiner—Justin K. Holmes
(74) Attorney, Agent, or Firm—Oliff & Berridge, PLC

(57) ABSTRACT

For regenerative generation at deceleration of a vehicle, a regenerative control apparatus for vehicles equipped with a lock-up clutch comprises a control unit for controlling rotary electric machine and the lock-up clutch. When the clutch is in a complete disengagement state or a slipping state at deceleration, the control unit controls the rotary electric machine to execute regenerative generation at a partial generation level lower than a regenerative generation level in a complete engagement state. When the clutch is in a complete engagement state at regenerative generation, the control unit controls the clutch so that the coupling state is transferred to a slipping state or a complete disengagement state when the number of revolutions having correlation to engine speed becomes lower than a predetermined threshold. Thus, recovering efficiency of the regenerative braking energy can be enhanced, while suppressing engine stall due to drastic increase of engine load torque.

20 Claims, 5 Drawing Sheets

REGENERATIVE CONTROL APPARATUS FOR VEHICLES EQUIPPED WITH A LOCK-UP CLUTCH

CROSS-REFERENCE TO RELATED APPLICATION

This application is based on and claims the benefit of priority from earlier Japanese Patent Application No. 2004-380046 filed on Dec. 28, 2004, the description of which is incorporated herein by reference.

BACKGROUND OF THE INVENTION

1. Technical Field of the Invention

The present invention relates to a regenerative control apparatus for vehicles equipped with a lock-up clutch for complete engagement with a hydraulic torque converter.

2. Prior Art

Regenerative control apparatuses for use in vehicles equipped with a lock-up clutch have been suggested.

Japanese Unexamined Patent Application Publication No. 07-310566, for example, suggests starting regenerative braking after bringing a lock-up clutch into a state of complete engagement, and stopping the regenerative braking after bringing the lock-up clutch into a state of complete disengagement when an engine speed becomes lower than a fuel-cut releasing speed.

Further, Japanese Unexamined Patent Application Publication No. 2004-224110 suggests a hybrid electric vehicle which performs regenerative braking after bringing a lock-up clutch into an engagement state including a complete engagement state or slipping state.

Further, Japanese Unexamined Patent Application Publication No. 2000-134713 suggests a hybrid electric vehicle which starts regenerative braking after bringing a lock-up clutch into a complete disengagement state or slipping state.

Specifically, in any of the regenerative control apparatuses for vehicles equipped with a lock-up clutch suggested in the patent literatures provided above, the state of the lock-up clutch is established first, and then according to the established state, execution or stoppage of regenerative generation is determined.

However, the regenerative braking control as disclosed in Japanese Unexamined Patent Application Publication No. 07-310566, and the mode for performing regenerative braking after bringing a lock-up clutch into a complete engagement state as disclosed in Japanese Unexamined Patent Application Publication No. 2004-224110, have arisen such disadvantages as provided below. In particular, in both of the cases, although good regenerative braking may be performed in a high-speed range of a vehicle, if some causes for drastically increasing engine load torque are given (e.g., a case where a hard stop is made in the complete engagement state of a lock-up clutch to lock the wheels), the engine speed may drastically decrease. Accordingly, the engine-generated torque may be decreased, possibly falling into a state of engine stall.

On the other hand, the regenerative braking control as disclosed in Japanese Unexamined Patent Application Publication No. 2000-134713, and the mode for performing regenerative braking after bringing a lock-up clutch into a slipping state as disclosed in Japanese Unexamined Patent Application Publication No. 2004-224110, have arisen such disadvantages as provided below. In particular, in these cases, although the engine stall described above is unlikely to be caused, there may be a problematic large energy loss in an automatic transmission and thus sufficient regeneration may not be expected. Further, as a result of drastic decrease of the engine speed due to regenerative braking, which necessitates stoppage of fuel cutting to prevent engine stall, fuel consumption may tend to be deteriorated.

In the regenerative control apparatuses for vehicles equipped with a lock-up clutch suggested in the patent literatures provided above, control for establishing some state in a lock-up clutch is executed in performing regenerative braking. In such a regenerative control, regenerative energy may be increased if regenerative braking is determined to be performed in a state where the coupling of a lock-up clutch has been strengthened. In return, however, the risk of engine stall may be increased. If, on the contrary, regenerative control is performed in a state where coupling of a lock-up clutch has been weakened, the risk of engine stall may be decreased. In this case, however, because the automatic transmission (typically, its hydraulic torque converter) is not being locked up, regenerative energy may not be effectively recovered. As a result, when regenerative generation is forcedly performed, the engine speed may tend to be drastically decreased to cause engine stall.

SUMMARY OF THE INVENTION

The present invention has been made in view of the problems described above, and has as its object to provide a regenerative control apparatus for vehicles equipped with a lock-up clutch, which enhances the efficiency of recovering regenerative braking energy, while suppressing engine stall due to drastic increase of engine load torque.

In order to achieve the above object, as one aspect, the present invention provides a regenerative control apparatus for a vehicle equipped with an engine and an automatic transmission mechanism equipped with a lock-up clutch, the automatic transmission mechanism transmitting an output of the engine to wheels of the vehicle, the regenerative control apparatus comprising: a first detection unit detecting information indicative of an engagement state of the lock-up clutch; a second detection unit detecting information indicative of revolutions of the engine; a rotary electric machine performing regenerative generation using energy brought about by the engine when the vehicle is in deceleration state; a first control unit, using the information provided by both the transmission unit and the detection unit, controlling the rotary electric machine so as to cause the rotary electric machine to perform the regenerative generation at a generation level lower than a regenerative generation level given when the lock-up clutch is in a complete engagement state in the deceleration state of the vehicle, in cases where the lock-up clutch is in either a complete disengagement state or a slipping state in the deceleration state of the vehicle; and a second control unit, using the information provided by both the transmission unit and the detection unit, controlling the lock-up clutch so as to shift the engagement state of the lock-up clutch to either the slipping state or the complete disengagement state, provided that the number of revolutions becomes equal to or less than a threshold in a condition where the lock-up clutch is in the complete engagement state during the regenerative generation.

In particular, in the present invention, in performing regenerative generation at the time of deceleration of a vehicle, when the coupling state of a lock-up clutch is a complete engagement state, high-level regenerative generation is carried out, and when the coupling state of a lock-up clutch is a complete disengagement state or a slipping state, regenerative generation is forcedly shifted to a low-level.

Thus, in the complete engagement state where wheel energy can be efficiently transmitted to a rotary electric machine, highly-potent regenerative generation can be performed to attain effects of highly-potent regenerative braking.

In the present invention, when the lock-up clutch is in a complete disengagement state or a slipping state, i.e. when the coupling of the lock-up clutch is weakened, regenerative generation is allowed to be maintained at a low level. As a result, regeneration rate of the wheel energy can be further increased.

In the present invention, a regenerative generation level is forcedly lowered to match the lowering of the transmission efficiency of the wheel energy to be transmitted from the wheels to the engine, which has been caused by the weakened coupling of the lock-up clutch. Accordingly, the rotary electric machine will never perform regenerative generation in a manner of considerably exceeding the wheel energy that has been recovered by the engine. Thus, regenerative generation of the present invention enables prevention of the risk of occurring engine stall due to the drastic lowering of engine speed, as well as the increase of fuel consumption which would have been caused by resuming fuel supply to avoid this risk.

In the present invention, when the lock-up clutch is in the complete engagement state as described above, the number of revolutions of the wheels or the engine speed is monitored, so that when the value obtained from monitoring is lowered to not more than a predetermined threshold, the state of the lock-up clutch may be transferred to a complete disengagement state or a slipping state. Therefore, if the engine load is drastically increased such as by sudden braking in the complete engagement state, highly-potent regenerative generation may be realized by adjusting the threshold to a suitable value (i.e. to a level that would not cause engine stall at the occurrence of sudden braking), while still preventing an engine stall.

Various other advantages which result from the structures of present invention, which are as follows.

In one preferred aspect, the threshold is set to a value that prohibits the engine from stalling even when the vehicle is brought into a sudden braking during the regenerative generation in the complete engagement of the lock-up clutch. Thus, in spite of performing the highly-potent regenerative generation in the complete engagement state of the lock-up clutch, when sudden braking has occurred that may cause engine stall, partial regenerative generation can be maintained while preventing engine stall.

In another preferred aspect, the rotary electric machine is controlled so that the regenerative generation is performed at a substantially maximum generation level in cases where the lock-up clutch is in the complete engagement state in the deceleration state of the vehicle. Thus, in regenerative braking, the wheel energy can be regenerated while avoiding engine stall to the maximum effective and possible extent.

Note that the "substantially maximum generation level" referred to herein is intended to be a maximum output current which can be generated by a generator with no difficulty in a decelerated state of vehicle at a certain time during regenerative generation, and can be stored in a battery with no difficulty.

In another preferred aspect, the rotary electric machine is controlled so that the regenerative generation is performed at the lower generation level in cases where the lock-up clutch is in the complete disengagement state in the deceleration state of the vehicle. Thus, when the lock-up clutch is in a complete disengagement state, regenerative generation can be performed to increase the energy regeneration rate, if only a little.

In another preferred aspect, the lock-up clutch is controlled so that the lock-up clutch is completely disengaged when the number of revolutions of the engine becomes a value equal to or lower than the predetermined threshold, in cases where the lock-up clutch is in the complete engagement state in the regenerative generation. Thus, when sudden braking has occurred during highly-potent regenerative generation with the lock-up clutch being in a complete engagement state, the lock-up clutch can be completely disengaged to match the lowering of the number of revolutions of the wheels or the engine speed, which has been caused by the sudden braking. In this way, occurrence of engine stall can be prevented. Since the threshold of the number of revolutions of the wheels or the engine speed can be shifted to a smaller value, regenerative generation rate can be increased that much in the complete engagement state having good efficiency.

In another preferred aspect, the apparatus may further comprise a third detection unit detecting information indicative of a transmission gear ratio of the automatic transmission mechanism; a fourth detection unit detecting formation indicative of a throttle opening of the engine; and a third control unit changing the threshold based on the information indicative of the transmission gear ratio, the throttle opening, and the number of revolutions. Thus, the threshold can be precisely controlled in a range that would not cause engine stall when highly-potent regenerative generation is performed. As a result, regenerative generation rate in various deceleration conditions can be increased.

In a preferred aspect, the apparatus may further comprise a fifth detection unit detecting information indicative of an operation state of an auxiliary device equipped on a vehicle and driven by the engine; and a fourth control unit changing the threshold based on the information indicative of the operation state of an auxiliary device. Thus, following the variation in the limitation of occurring engine stall, which depends on the driving conditions of auxiliary devices (or accessories) (e.g., compressor for air conditioner), the range of the deceleration conditions for performing highly-potent regenerative generation in a complete engagement state can be enlarged. In this way, the regenerative generation rate can be increased.

Still, in a preferred aspect, the apparatus may further comprise a sixth detection unit detecting information indicative of an operation state of an anti-braking system (ABS) equipped on the vehicle; and a fifth control unit changing the threshold based on the information indicative of the operation state of the ABS. Thus, following the variation in the limitation of occurring engine stall, which depends on the occurrence of ABS operation, the range of the deceleration conditions for performing highly-potent regenerative generation in a complete engagement state can be enlarged. In this way, the regenerative generation rate can be increased.

DETAILED DESCRIPTION OF THE PREFERRED EMBODIMENTS

The preferred aspects of the present invention will now be described in detail by way of an embodiment provided below. Note that the present invention should not be limited to the following embodiment, but the concept of the present invention may be realized using other known techniques.

Figure 1:
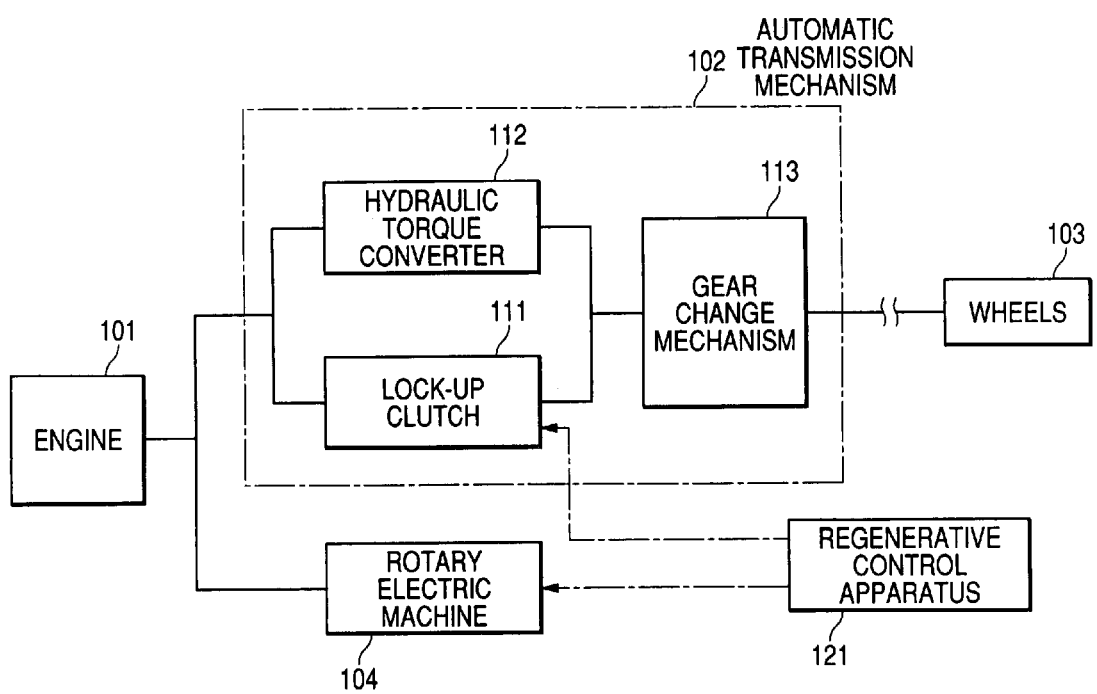
FIG. 1 is a schematic block diagram functionally outlining an arrangement of a power transmission system for vehicles equipped with a lock-up clutch loaded with a regenerative control apparatus according to an embodiment of the present invention.

With reference to FIG. 1, a brief explanation will now be given hereunder on a power transmission system for vehicles equipped with a lock-up clutch loaded with a regenerative control apparatus related to this embodiment.

In such a vehicle equipped with a lock-up clutch, an engine 101 transmits power to wheels 103 through an automatic transmission (automatic transmission mechanism AT) 102. The engine 101 is linked to a rotary electric machine 104 in a manner enabling torque reception/transmission. The rotary electric machine 104 substantially carries out regenerative generation with the aid of energy from the engine at the time of decelerating the vehicle. The rotary electric machine 104 is constituted of a commonly used AC generator for vehicles, which may alternatively be a so-called generator motor.

The automatic transmission 102 is provided with a lock-up clutch 111, a hydraulic torque converter 112, and a gear change mechanism 113. Thus, the power from the engine 101 is transmitted to the wheels 103 through the lock-up clutch 111 or the hydraulic torque converter 112, and the gear change mechanism 113.

The lock-up clutch 111 is constituted of an electromagnetic clutch or an electrically controlled hydraulic clutch, and brings about three engagement (coupling) states, i.e. a complete engagement state, a complete disengagement state and a slipping state, according to a control command from outside (the regenerative control apparatus 121).

In the complete disengagement state, torque reception/transmission is performed between the engine 101 and the gear change mechanism 113 through the hydraulic torque converter 112. In the complete engagement state, torque reception/transmission is performed between the engine 101 and the gear change mechanism 113 through the lock-up clutch 111. In the slipping state, torque reception/transmission is performed between the engine 101 and the gear change mechanism 113 through both of the hydraulic torque converter 112 and the lock-up clutch 111. Since the power transmission system per se for such types of vehicles is already known and is out of the gist of the present embodiment, further description therefor is omitted herein.

The vehicle described above is provided with a regenerative control apparatus (regenerative generation control apparatus) 121 which is configured to control at least regenerative generation performed by the rotary electric machine 104, and a coupling state of the lock-up clutch 111.

Figure 2:
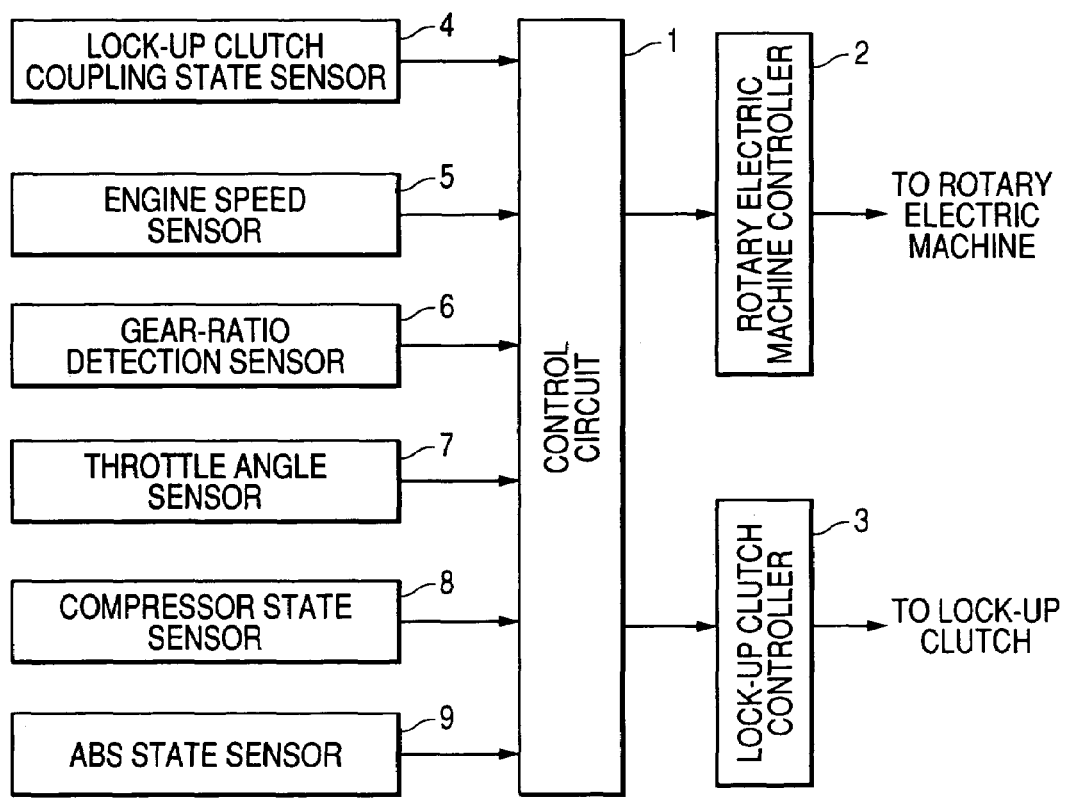
FIG. 2 is a block diagram of the regenerative control apparatus for vehicles equipped with a lock-up clutch according to the embodiment of the present invention.

With reference to the block diagram shown in FIG. 2, description is provided hereunder on the regenerative control apparatus 121.

The regenerative control apparatus 121 comprises a control circuit 1, a rotary electric machine controller 2, a lock-up clutch controller 3, a lock-up clutch coupling state sensor 4, an engine speed sensor 5, a gear-ratio detection sensor 6, a throttle angle sensor 7, a compressor state sensor 8, and an ABS (anti-braking system) state sensor 9. These are sequentially described below.

The control circuit 1 is an electronic control unit (ECU) for operating at least regenerative generation control and lock-up clutch control, and comprises a microcomputer. Alternatively, the control circuit 1 may be constituted of an existing electronic control unit (not shown), such as an engine control unit.

The rotary electric machine controller 2 is incorporated into a vehicle AC generator that constitutes the rotary electric machine 104 of the embodiment, and comprises a generation controller, which is commonly called as a regulator, for battery charging. However, in case generator motors are employed as the rotary electric machine 104, known motor controllers, such as inverters, may be employed. In the present embodiment, the rotary electric machine controller 2 controls the generation level of the vehicle AC generator at the time of regeneration, with either a maximum generation mode or a partial generation mode, based on a command S1 from the control circuit 1. In the present embodiment, the maximum generation mode is intended to be a generation operation at an output current capable of maximum output which is currently available in the vehicle AC generator, within a limit that is equal to or less than an allowable charge current of the battery.

The lock-up clutch controller 3 is a device for controlling the coupling state of the lock-up clutch 111, that is, a device imparting the lock-up clutch 111 with any one of the coupling states, i.e. the complete engagement state, the complete disengagement state and the slipping state. The lock-up clutch controller 3 may be constituted, for example, of an electromagnetic switch and a solenoid valve.

The lock-up clutch coupling state sensor 4 constitutes a lock-up clutch coupling information transmitter circuit as referred to in the present invention, that is, a circuit or a sensor which transmits a coupling state of the lock-up clutch 111 to the control circuit 1. For example, in case a command related to a coupling state of the lock-up clutch 111 made by an engine controller (not shown) or other controllers is transmitted to the control circuit 1, the engine controller per se is to constitute the lock-up clutch coupling state sensor 4.

The engine speed sensor 5 is a sensor for detecting the engine speed, and constitutes a number of revolution information detection circuit. Description on the engine speed sensor 5 is omitted since it is commonly mounted on the engine 101. Note that the engine speed sensor 5 does not necessarily have to detect the engine speed per se, but may detect physical quantity having correlation to the engine speed. For example, the physical quantity includes the AC voltage frequency of one phase of current generated by the vehicle AC generator constituting the rotary electric machine 104, and the number of revolutions of the output shaft of the automatic transmission (AT) (AT output-shaft revolutions). In the present embodiment, the engine speed sensor 5 detects the AT output-shaft revolutions as the engine speed as will be described later.

The gear-ratio detection sensor 6 is a circuit or a sensor for transmitting the gear ratio of the gear change mechanism 113 in the automatic transmission mechanism 102 to the control circuit 1, and constitutes a gear ratio information transmitter circuit. For example, in case a command related to a gear ratio of the gear change mechanism 113 made by the engine controller (not shown) or the like is transmitted to the control circuit 1, the engine controller per se is to constitute the gear-ratio detection sensor 6.

The throttle angle sensor 7 is a sensor for detecting a throttle angle of the engine 101, and constitutes a throttle angle information transmitter circuit. Description on the throttle angle sensor 7 is omitted since it is commonly mounted on an engine. Note that the throttle sensor 7 does not necessarily have to detect the throttle angle perse, but may detect the position of the throttle. In case a command related to a throttle angle made by the engine controller (not shown) or the like is transmitted to the control circuit 1, the engine controller per se is to constitute the throttle angle sensor 7.

The compressor state sensor 8 is a circuit or a sensor for transmitting an operational state of a compressor for on-vehicle air conditioner (not shown) to the control circuit 1, and constitutes an auxiliary-device state transmitter circuit. In case a command related to a compressor state made by an air conditioner controller (not shown) is utilized, the air conditioner controller per se is to constitute the compressor state sensor 8. The compressor states to be detected may include only an on-state and off-state, or may include more detailed information on the power consumption. Note that a circuit for transmitting power consumption state of current consumers other than the compressor to the control circuit 1, may be allowed to operate as the auxiliary-device state transmitter circuit.

The ABS state sensor 9 is a sensor for detecting an anti-braking system (not shown) mounted on a vehicle, and constitutes an ABS state transmitter circuit. An on-state and an off-state of the ABS are detected by the ABS state sensor 9. In case a command related to the states of an ABS made by an ABS controller (not shown) is utilized, the ABS controller per se is to constitute the ABS state sensor 9.

Figure 3:
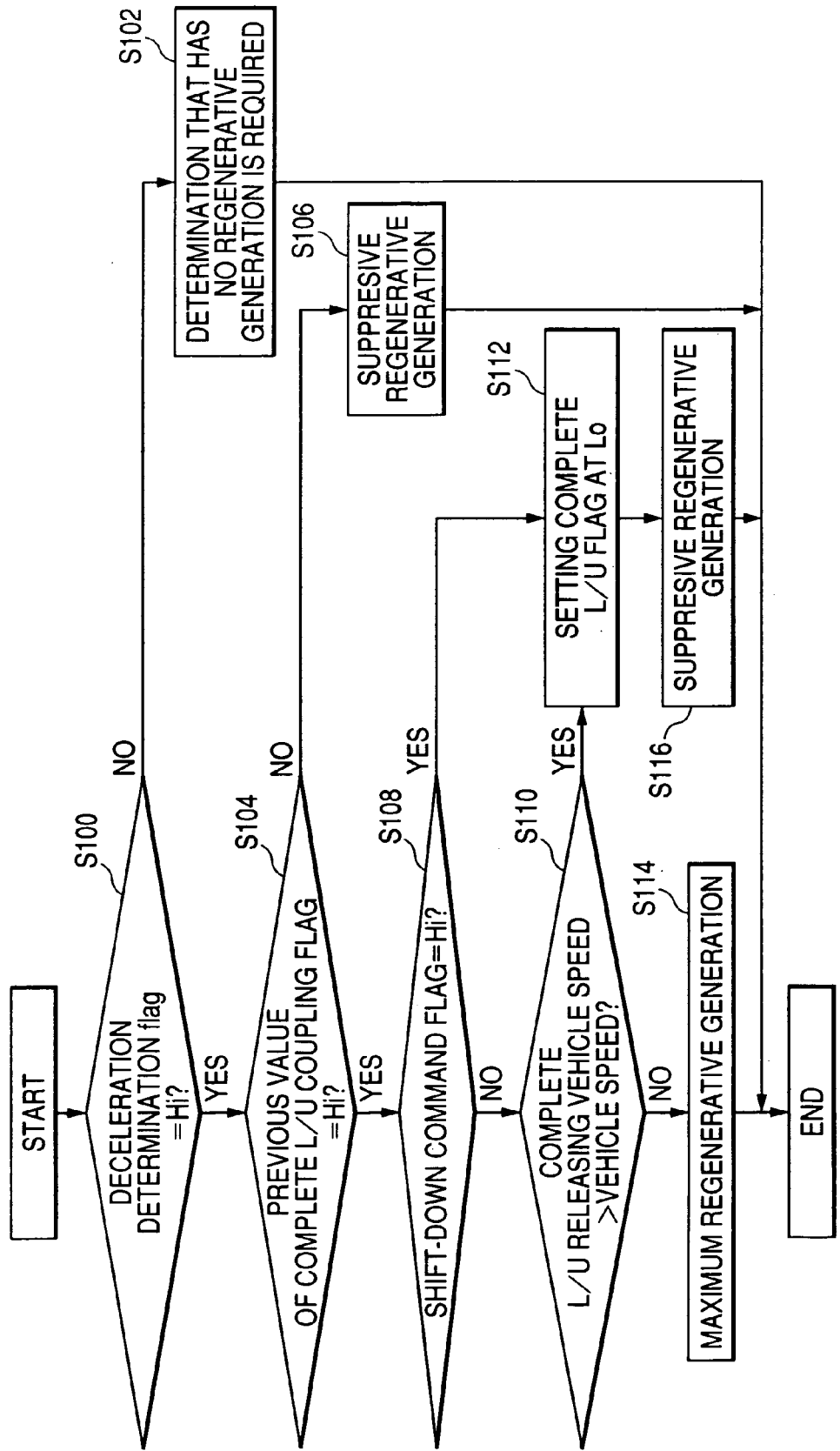
FIG. 3 is a flow diagram showing regenerative generation control performed by the regenerative control apparatus according to the embodiment.

With reference to the flow diagram of FIG. 3, a detailed description is provided below on a regenerative braking control subroutine performed by the regenerative control apparatus 121 of the present embodiment. Note that this regenerative braking control subroutine is repeatedly executed by the control circuit 1 of the regenerative control apparatus 121 with a predetermined short interval.

The control circuit 1 firstly determines whether or not a deceleration determination flag indicates a high level, i.e. whether or not deceleration has been caused (step S100). The deceleration determination flag is established at a storage unit, such as a register and a memory, in a microcomputer constituting the control circuit 1. This setting is made, for example, on the basis of a vehicle speed detected by a vehicle speed sensor (not shown).

As a result, if the deceleration determination flag indicates a low level (NO), the control circuit 1 determines that no deceleration has been caused and that no regenerative braking (i.e., regenerative generation) is required. Then, the command S1 is issued to the rotary electric machine controller 2 to inhibit regenerative generation by the rotary electric machine 104 (step S102), and then control returns to the main routine. On the contrary, if the deceleration determination flag indicates a high level (YES), the control circuit 1 determines that deceleration has been caused, and that the regenerative braking (regenerative generation) is required. Then, control proceeds to next step S104.

At step S104, the control circuit 1 determines whether or not the previous value of a complete engagement state flag (complete L/U (lock-up clutch) coupling flag) indicates a high level, i.e. whether or not the lock-up clutch is currently in a complete engagement state. The complete L/U coupling flag is set up at the storage unit, such as a register and a memory in the microcomputer constituting the control circuit 1. This setting is made based on a value detected by the lock-up clutch coupling state sensor 4.

As a result of the above determination, if the previous value of the complete L/U coupling flag indicates a low level (NO), the control circuit 1 determines that the lock-up clutch 111 is in a complete disengagement state or in a slipping state. Accordingly, the control circuit 1 determines that the efficiency of regenerative generation by the rotary electric machine 104 is not high, and that a predetermined portion of mechanical energy for the regenerative generation is not to be covered by the wheel deceleration energy but by the inertial energy of the engine 101. Subsequently, the control circuit 1 issues the command S1 for executing a partial generation mode to the rotary electric machine controller 2, by which regenerative generation by the rotary electric machine 104 is carried out in a suppressive manner (step S106). On the contrary, when the previous value of the complete L/U coupling flag indicates a high level (YES), the control circuit 1 determines that the lock-up clutch is in a complete engagement state exerting high regenerative generation efficiency, and that most of the mechanical energy for the regenerative generation is to be covered by the wheel deceleration energy. Control then proceeds to step S108.

At step S108, the control circuit 1 determines whether or not a shift-down command flag indicates a high level, i.e. whether or not a shift-down command has been issued. The shift-down command flag is set up, for example, at the storage unit, such as a register and a memory in the microcomputer constituting the control circuit 1. This setting is made based, for example, on a command value issued by the engine controller (not shown) or the like.

As a result of the above determination, if the shift-down command flag indicates a low level (NO), the control circuit 1 determines that the shift-down command has not been issued, and then control proceeds to step S110. Contrarily, if the shift-down command flag indicates a high level (YES), the control circuit 1 determines that the shift-down command has been issued, and then control proceeds to step S112. In this case, since the achievement of a complete disengagement state by the lock-up clutch is required prior to the shift-down, control proceeds to step S112, which will be described later, to allow for complete disengagement of the lock-up clutch. After achieving the complete disengagement state, a command S2 enabling shifting down is issued to the lockup clutch controller 3.

At step S110, the control circuit 1 determines whether or not the vehicle speed has been lowered to not more than a preset vehicle speed for releasing the complete engagement state of the lock-up clutch (also referred to as "complete L/U releasing vehicle speed"). The "complete L/U releasing vehicle speed" in this case corresponds to the "threshold" referred to in the present invention.

As a result of the above determination, if the vehicle speed is lower than the complete L/U releasing vehicle speed (YES), then control proceeds to step S112. Contrarily, if the vehicle speed is equal to or more than the L/U releasing vehicle speed (NO), then control proceeds to step S114. At step S114, the control circuit 1 issues the command S1 for executing a maximum generation mode to the rotary electric machine controller 2, by which the rotary electric machine 104 is permitted to carry out highly-potent regenerative generation to effectively recover the deceleration energy. The subroutine is then terminated. At step S114, it is intended that the maximum regenerative generation available by the rotary electric machine 104 is carried out in the present embodiment. In case vehicle AC generator is used as the rotary electric machine 104, the maximum regenerative generation may be achieved by maximizing an exciting current to be passed to its magnetic coil.

The complete L/U releasing vehicle speed (vehicle speed set value for release) described above means vehicle speed for releasing a complete engagement state of the lock-up clutch 111. It also means, in the present embodiment, the number of revolutions of an output shaft of the automatic transmission 102 (AT output-shaft revolutions) having the lock-up clutch, which does not cause engine stall when the engine load torque is drastically increased. The vehicle speed referred to at step S110 corresponds to the engine speed, since the lock-up clutch 111 in this state is in a complete engagement state. This engine speed is detected by the engine speed sensor 5, as described above, and inputted to the control circuit 1.

Note that, in the present embodiment, the complete L/U releasing vehicle speed, i.e. the "threshold" referred to in the present invention, varies according to the vehicle conditions (e.g., engine speed, gear ratio, throttle angle, compressor state and ABS state). This complete L/U releasing vehicle speed will be described later.

At step S112 described above, the control circuit 1 sets a complete lock-up flag (also referred to as "complete L/U flag") at a low level and then control proceeds to step S116. When the complete L/U flag is set at a low level, upon subsequent execution of a subroutine (not shown) for controlling the lock-up clutch, the complete engagement state of the lock-up clutch 111 is released, and the lock-up clutch 111 is then completely disengaged.

Subsequently, at step S116, after issuing the command S1 for permitting the rotary electric machine 104 to execute suppressive regenerative generation, the control circuit 1 terminates this subroutine.

As described above, according to the regenerative braking control subroutine which is executed, at the time of deceleration, by the regenerative control apparatus 121, the regenerative generation is suppressed to be lower than the original level if the lock-up clutch 111 is in a complete disengagement state or a slipping state. Contrarily, if the lock-up clutch 111 is in a complete engagement state, highly-potent regenerative generation is performed until the vehicle speed is raised up to the predetermined value (complete L/U releasing vehicle speed). When the vehicle speed becomes lower than the predetermined value (complete L/U releasing vehicle speed) with the lock-up clutch 111 being in a complete engagement state, the lock-up clutch 111 is then brought into a complete disengagement state to avoid engine stall. When a shift-down command has been issued in a complete engagement state, the lock-up clutch 111 is again brought into a complete disengagement state to enable shifting down.

With reference to the timing diagram shown in FIG. 4, the effects that can be realized by the regenerative generation control of the above embodiment are described below. Note that the release vehicle speed indicated in FIG. 4 refers to the complete L/U releasing vehicle speed (threshold) described above.

Figure 4:
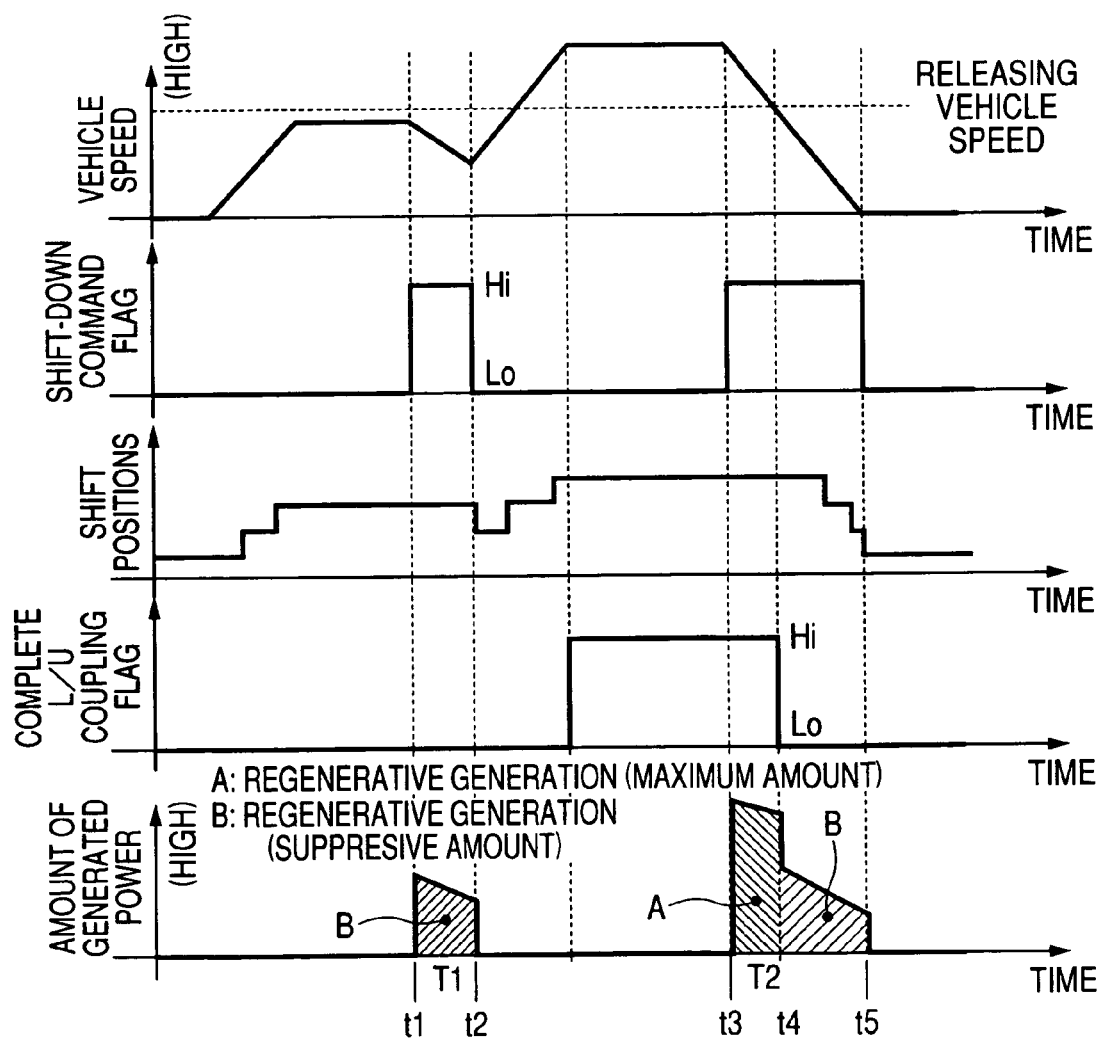
FIG. 4 is a timing diagram showing a case where regenerative generation control is performed by the regenerative control apparatus according to the embodiment.

FIG. 4 shows the generation rates (energy) that can be achieved in regeneration when a vehicle runs effecting the regenerative generation control. The abscissa indicates time and the ordinate indicates vehicle speed, deceleration determination flag, shifting position, complete L/U flag indicating complete engagement state, and generation rate by regenerative generation. Time points are indicated by t1-t5. T1(t1-t2) and T2(t3-t4-t5) each indicate deceleration periods (i.e. the periods when the deceleration determination flag indicates a high level).

As shown in FIG. 4, in the deceleration period T1, the lock-up clutch is not in a complete engagement state, and thus the complete L/U flag indicates a low level. Accordingly, in response to the partial generation mode command S1 from the control circuit 1, the rotary electric machine 104 performs generation at a partial generation rate B which is smaller than a maximum generation rate (maximum output current) A available by the vehicle AC generator, under the control of the rotary electric machine controller 2 (step S106).

On the other hand, at the initial stage (t3-t4) of the deceleration period T2, the lock-up clutch 111 is in a complete engagement state, so that the complete L/U flag indicates a high level. Accordingly, in response to the maximum generation mode command S1 from the control circuit 1, the rotary electric machine 104 performs generation at the maximum generation rate (maximum output current) A available by the vehicle AC generator, under the control of the rotary electric machine controller 2 (step S114).

However, at the later stage (t4-t5) of the deceleration period T2, the vehicle speed becomes lower than the vehicle speed set value for release (i.e. the complete L/U releasing vehicle speed, which is referred to herein as "threshold"). Then, the lock-up clutch 111 is brought into a complete disengagement state from a complete engagement state (step S112), and thus the complete L/U flag changes its indication from a high level to a low level. As a result, in response to the partial generation mode command S1 from the control circuit 1, regenerative generation performed by the rotary electric machine 104 is suppressed, so that the maximum generation amount A is rendered to be the partial generation amount B, under the control of the rotary electric machine controller 2 (step S116 or S106).

Figure 5:
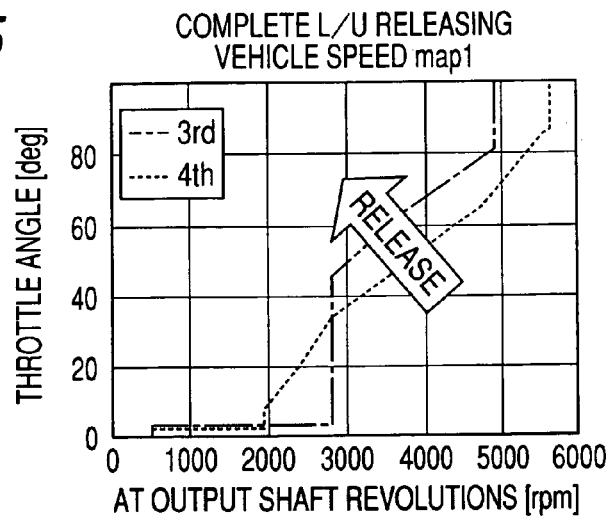
FIG. 5 is a characteristic diagram showing one example of a map used for the change of a vehicle speed set value for release performed by the regenerative control apparatus according to the embodiment.
Figure 6:
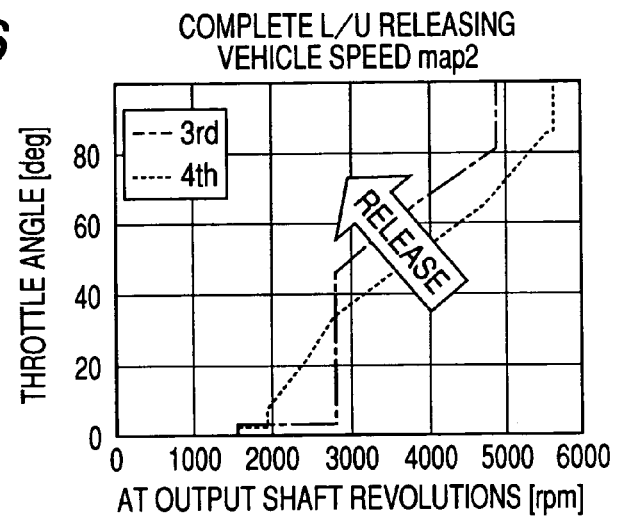
FIG. 6 is a characteristic diagram showing another example of a map used for the change of a vehicle speed set value for release performed by the regenerative control apparatus according to the embodiment.
Figure 7:
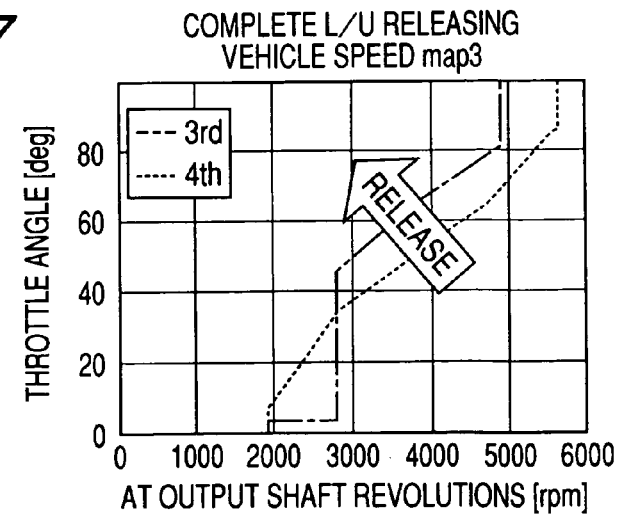
FIG. 7 is a characteristic diagram showing another example of a map used for the change of a vehicle speed set value for release performed by the regenerative control apparatus according to the embodiment.

With reference to FIGS. 5 to 7, description is provided below on the change of the complete L/U releasing vehicle speed, i.e. a vehicle speed set value for release, described above.

This complete L/U releasing vehicle speed (vehicle speed set value for release) is a vehicle speed within a limit not causing engine stall when a large engine load, such as sudden braking, has abruptly occurred at the time of regenerative generation in a complete engagement state of the lock-up clutch 111. Since the lock-up clutch 111 is in the complete engagement state, the vehicle speed is in proportion to the engine speed. This vehicle speed within the limit that would not cause engine stall, however, may vary being effected by various driving conditions. In the present embodiment, therefore, the vehicle speed set value for release, i.e. the vehicle speed within the limit not causing engine stall, is changed according to the driving conditions.

The graphs (maps) of FIGS. 5 to 7 show the vehicle speed set values for release at a third gear speed and a fourth gear speed, which accord with the throttle angle. The abscissas in the figures each indicate the AT output-shaft revolutions "rpm" corresponding to the vehicle speed set values for release, and the ordinates each indicate the throttle angles "deg". In the graphs, the chain lines each indicate the vehicle speed set values for release at the third gear speed, and the dotted lines each indicate the vehicle speed set values for release at the fourth gear speed. In the graphs, the right side regions of each of the lines are the regions where no engine stall is caused when the engine load is drastically increased due to sudden braking or the like in the complete engagement state. The left side regions of each of the lines in the figure are the regions where engine stall is caused by the drastic increase in the engine load unless the coupling of the lock-up clutch is decreased.

FIG. 5 shows the vehicle speed set value for release at the third gear speed and the fourth gear speed when the ABS is in an off-state and the compressor is also in an off-state. FIG. 6 shows the vehicle speed set value for release at the third gear speed and the fourth gear speed when the ABS is in an off-state and the compressor is in an on-state. FIG. 7 shows the vehicle speed set value for release at the third gear speed and the fourth gear speed when the ABS is in an on-state and the compressor is also in an on-state.

The vehicle speed set value for release is changed by only allowing the control circuit 1 in the regenerative control apparatus 121 to select one of the plurality of maps stored in advance, based on the read-in necessary information. This change of the vehicle speed set value for release is executed by the control circuit 1 by using a different subroutine than the subroutine shown in FIG. 3.

Specifically, in executing the subroutine for changing the vehicle speed set value for release, the control circuit 1 inputs the current transmission gear ratio (third gear speed and fourth gear speed) detected by the gear-ratio detection sensor 6, the presence/absence of compressor operation detected by the compressor state sensor 8, the operating state of the anti-braking system (ABS) detected by the ABS state sensor 9, and the throttle angle detected by the throttle angle sensor 7. Then, the control circuit 1 may only have to select a value of the AT output-shaft revolutions as the vehicle speed set value for release referring, for example, to the maps shown in FIGS. 5 to 7 which have been stored in advance. In this way, a vehicle speed set value for release can be changed in accordance with the driving conditions, within a vehicle speed limit not causing engine stall.

Note that, as a modification here, the control circuit 1 may input only the transmission gear ratio from the gear ratio sensor 6, and the throttle angle from the throttle angle sensor 7 to change the vehicle speed set value for release described above, based on these values. Alternatively, the control circuit 1 may input only auxiliary-device states from auxiliary-device state sensors, such as the compressor state sensor 8, to change the vehicle speed set value for release described above, based on the value. Alternatively, the control circuit 1 may change the vehicle speed set value for release described above based on the ABS operating state from the ABS state sensor 9.

The present invention may be embodied in several other forms without departing from the spirit thereof. The embodiments and modifications described so far are therefore intended to be only illustrative and not restrictive, since the scope of the present invention is defined by the appended claims rather than by the description preceding them. All changes that fall within the metes and bounds of the claims, or equivalents of such metes and bounds, are therefore intended to be embraced by the claims.

What is claimed is:

1. A regenerative control apparatus for a vehicle equipped with an engine and an automatic transmission mechanism equipped with a lock-up clutch, the automatic transmission mechanism transmitting an output of the engine to wheels of the vehicle, the regenerative control apparatus comprising:
   a first detection unit detecting information indicative of an engagement state of the lock-up clutch;
   a second detection unit detecting information indicative of revolutions per unit time of the engine;
   a rotary electric machine performing regenerative generation using energy brought about by the engine when the vehicle is in deceleration state;
   a first control unit, using the information provided by both the first detection unit and the second detection unit, controlling the rotary electric machine so as to cause the rotary electric machine to perform the regenerative generation at a generation level lower than a regenerative generation level given when the lock-up clutch is in a complete engagement state in the deceleration state of the vehicle, in cases where the lock-up clutch is in either a complete disengagement state or a slipping state in the deceleration state of the vehicle; and
   a second control unit, using the information provided by both the first detection unit and the second detection unit, controlling the lock-up clutch so as to shift the engagement state of the lock-up clutch to either the slipping state or the complete disengagement state, provided that the number of revolutions per unit time becomes equal to or less than a threshold in a condition where the lock-up clutch is in the complete engagement state during the regenerative generation.

2. The apparatus of claim 1, wherein the threshold is set to a value that prohibits the engine from stalling even when the vehicle is brought into a sudden braking during the regenerative generation in the complete engagement of the lock-up clutch.

3. The apparatus of claim 2, wherein the first control unit is configured to control the rotary electric machine so that the regenerative generation is performed at a substantially maximum generation level in cases where the lock-up clutch is in the complete engagement state in the deceleration state of the vehicle.

4. The apparatus of claim 3, wherein the first control unit is configured to control the rotary electric machine so that the regenerative generation is performed at the lower generation level in cases where the lock-up clutch is in the complete disengagement state in the deceleration state of the vehicle.

5. The apparatus of claim 1, wherein the second control unit is configured to control the lock-up clutch so that the lock-up clutch is completely disengaged when the number of revolutions per unit time of the engine becomes a value equal to or lower than the predetermined threshold, in cases where the lock-up clutch is in the complete engagement state in the regenerative generation.

6. The apparatus of claim 1, further comprising:
   a third detection unit detecting information indicative of a transmission gear ratio of the automatic transmission mechanism;
   a fourth detection unit detecting formation indicative of a throttle angle of the engine; and
   a third control unit changing the threshold based on the information indicative of the transmission gear ratio, the throttle opening, and the number of revolutions per unit time.

7. The apparatus of claim 6, further comprising:
a fifth detection unit detecting information indicative of an operation state of an auxiliary device equipped on vehicle and driven by the engine; and
a fourth control unit changing the threshold based on the information indicative of the operation state of an auxiliary device.

8. The apparatus of claim 6, further comprising:
a sixth detection unit detecting information indicative of an operation state of an anti-braking system (ABS) equipped on the vehicle; and
a fifth control unit changing the threshold based on the information indicative of the operation state of the ABS.

9. The apparatus of claim 1, wherein the first control unit is configured to control the rotary electric machine so that the regenerative generation is performed at a substantially maximum generation level in cases where the lock-up clutch is in the complete engagement state in the deceleration state of the vehicle.

10. The apparatus of claim 9, wherein the first control unit is configured to control the rotary electric machine so that the regenerative generation is performed at the lower generation level in cases where the lock-up clutch is in the complete disengagement state in the deceleration state of the vehicle.

11. The apparatus of claim 9, wherein the second control unit is configured to control the lock-up clutch so that the lock-up clutch is completely disengaged when the number of revolutions per unit time of the engine becomes a value equal to or lower than the predetermined threshold, in cases where the lock-up clutch is in the complete engagement state in the regenerative generation.

12. The apparatus of claim 11, further comprising:
a third detection unit detecting information indicative of a transmission gear ratio of the automatic transmission mechanism;
a fourth detection unit detecting formation indicative of a throttle angle of the engine; and
a third control unit changing the threshold based on the information indicative of the transmission gear ratio, the throttle opening, and the number of revolutions per unit time.

13. The apparatus of claim 12, further comprising:
a fifth detection unit detecting information indicative of an operation state of an auxiliary device equipped on vehicle and driven by the engine; and
a fourth control unit changing the threshold based on the information indicative of the operation state of an auxiliary device.

14. The apparatus of claim 12, further comprising:
a sixth detection unit detecting information indicative of an operation state of an anti-braking system (ABS) equipped on the vehicle; and
a fifth control unit changing the threshold based on the information indicative of the operation state of the ABS.

15. A regenerative control apparatus for a vehicle equipped with an engine and an automatic transmission mechanism equipped with a lock-up clutch, the automatic transmission mechanism transmitting an output of the engine to wheels of the vehicle, the regenerative control apparatus comprising:
a first detection unit detecting information indicative of an engagement state of the lock-up clutch;
a second detection unit detecting information indicative of revolutions per unit time of the engine;
a rotary electric machine performing regenerative generation using energy brought about by the engine when the vehicle is in deceleration state; and
a control unit controlling both the rotary electric machine and the lock-up clutch depending on the information provided by both the first detection unit and the second detection unit,
wherein the control unit includes
first control means for controlling the rotary electric machine so as to cause the rotary electric machine to perform the regenerative generation at a generation level lower than a regenerative generation level given when the lock-up clutch is in a complete engagement state in the deceleration state of the vehicle, in cases where the lock-up clutch is in either a complete disengagement state or a slipping state in the deceleration state of the vehicle, and
second control means for controlling the lock-up clutch so as to shift the engagement state of the lock-up clutch to either the slipping state or the complete disengagement state, provided that the number of revolutions per unit time becomes equal to or less than a threshold in a condition where the lock-up clutch is in the complete engagement state during the regenerative generation.

16. A method of controlling regenerative generation for a vehicle equipped with (i) an engine, (ii) an automatic transmission mechanism equipped with a lock-up clutch, the automatic transmission mechanism transmitting an output of the engine to wheels of the vehicle, (iii) a first detection unit detecting information indicative of an engagement state of the lock-up clutch, (iv) a second detection unit detecting information indicative of revolutions per unit time of the engine, and (v) a rotary electric machine performing regenerative generation using energy brought about by the engine when the vehicle is in deceleration state, the method comprising step of:
first determining, using the information provided by both the first detection unit and the section detection unit, whether or not the lock-up clutch is in either a complete disengagement state or a slipping state in the deceleration state of the vehicle;
first controlling, if the first determining step shows an affirmative determination, the rotary electric machine so as to cause the rotary electric machine to perform the regenerative generation at a generation level lower than a regenerative generation level given when the lock-up clutch is in a complete engagement state in the deceleration state of the vehicle;
second determining, using the information provided by both the first detection unit and the second detection unit, whether or not the number of revolutions per unit time becomes equal to or less than a threshold in cases where the lock-up clutch is in the complete engagement state during the regenerative generation; and
second controlling, if the second determining step shows an affirmative determination, the lock-up clutch so as to shift the engagement state of the lock-up clutch to either the slipping state or the complete disengagement state.

17. The method of claim 16, wherein the threshold is set to a value that prohibits the engine from stalling even when the vehicle is brought into a sudden braking during the regenerative generation in the complete engagement of the lock-up clutch.

18. The method of claim 16, wherein the first control step controls the rotary electric machine so that the regenerative generation is performed at a substantially maximum generation level in cases where the lock-up clutch is in the complete engagement state in the deceleration state of the vehicle.

19. The method of claim 18, wherein the first control step controls the rotary electric machine so that the regenerative generation is performed at the lower generation level in cases where the lock-up clutch is in the complete disengagement state in the deceleration state of the vehicle.

20. The method of claim 16, wherein the second control step controls the lock-up clutch so that the lock-up clutch is completely disengaged when the number of revolutions per unit time of the engine becomes a value equal to or lower than the predetermined threshold, in cases where the lock-up clutch is in the complete engagement state in the regenerative generation.

* * * * *